United States Patent
Schönfeld et al.

(10) Patent No.: US 11,047,810 B2
(45) Date of Patent: Jun. 29, 2021

(54) METHOD FOR MONITORING THE FUNCTIONAL STATE OF A SYSTEM FOR COMPUTER-TOMOGRAPHIC EXAMINATION OF WORKPIECES

(71) Applicants: Volume Graphics GmbH, Heidelberg (DE); Physikalisch-Technische Bundesanstalt, Braunschweig (DE)

(72) Inventors: Torsten Schönfeld, Braunschweig (DE); Markus Bartscher, Edemissen (DE); Thomas Günther, Heidelberg (DE); Christoph Poliwoda, Heidelberg (DE); Christof Reinhart, Heidelberg (DE)

(73) Assignee: Volume Graphics GmbH, Heidelberg (DE)

( * ) Notice: Subject to any disclaimer, the term of this patent is extended or adjusted under 35 U.S.C. 154(b) by 7 days.

(21) Appl. No.: 16/343,858

(22) PCT Filed: Oct. 20, 2016

(86) PCT No.: PCT/EP2016/075278
§ 371 (c)(1),
(2) Date: Apr. 22, 2019

(87) PCT Pub. No.: WO2018/072834
PCT Pub. Date: Apr. 26, 2018

(65) Prior Publication Data
US 2019/0265175 A1 Aug. 29, 2019

(51) Int. Cl.
*G01N 23/046* (2018.01)
*H05G 1/54* (2006.01)
*H05G 1/26* (2006.01)

(52) U.S. Cl.
CPC ............. *G01N 23/046* (2013.01); *H05G 1/54* (2013.01); *G01N 2223/643* (2013.01); *G01N 2223/645* (2013.01); *H05G 1/26* (2013.01)

(58) Field of Classification Search
CPC .................. G01N 23/046; G01N 23/18; G01N 23/20083; G01N 23/201; G01N 23/203;
(Continued)

(56) References Cited

U.S. PATENT DOCUMENTS

| | | | |
|---|---|---|---|
| 6,264,365 B1 * | 7/2001 | Patch | A61B 6/032 250/252.1 |
| 2007/0036264 A1 | 2/2007 | Beyrard | |
| 2017/0153188 A1 * | 6/2017 | Engel | G01N 23/203 |

FOREIGN PATENT DOCUMENTS

| | | |
|---|---|---|
| DE | 102006048608 A1 | 4/2008 |
| JP | 2000-258542 | 9/2000 |

(Continued)

OTHER PUBLICATIONS

Japan Patent Office, Notification of Reasons for Rejection for Japanese Patent Application No. 2019-521448, dated Jul. 14, 2020.
(Continued)

*Primary Examiner* — Christine S. Kim
(74) *Attorney, Agent, or Firm* — SoCal IP Law Group LLP; Angelo J. Gaz (57) ABSTRACT

Computer-implemented methods for monitoring the functional state of a system for the computer-tomographic examination of workpieces by carrying out one or more computer-tomographic measurements on the workpiece. The measurements each result here in at least one measured value for at least one measurement variable. The method for monitoring the functional state selects measured values for at least one measurement variable from at least two measurements on one or more workpieces. At least one degree of variation for the selected measured values of the at least (Continued)

one measurement variable as well as at least one reference degree of variation for measured values of the at least one measurement variable is determined. The functional state of the system is determined by comparing the at least one determined degree of variation with the at least one reference degree of variation for the at least one measurement variable.

15 Claims, 2 Drawing Sheets

(58) Field of Classification Search
CPC ....... G01N 2223/053; G01N 2223/054; G01N 2223/063; G01N 2223/419; G01N 2223/643; G01N 2223/645; G01N 2223/646; H05G 1/26; H05G 1/54
See application file for complete search history.

(56) References Cited

FOREIGN PATENT DOCUMENTS

| | | | |
|---|---|---|---|
| JP | 2002-131439 | | 5/2002 |
| JP | 2005-283180 | | 10/2005 |
| JP | 2007-171063 | | 7/2007 |
| JP | 2007171063 A | * | 7/2007 |
| WO | 2018/072834 A1 | | 4/2018 |

OTHER PUBLICATIONS

European Patent Office, International Search Report for PCT Application No. PCT/EP2016/075278, dated Jun. 8, 2017.

* cited by examiner

METHOD FOR MONITORING THE FUNCTIONAL STATE OF A SYSTEM FOR COMPUTER-TOMOGRAPHIC EXAMINATION OF WORKPIECES

RELATED APPLICATIONS

This application is a National Stage of Patent Cooperation Treaty application PCT/EP2016/075278 filed Oct. 20, 2016.

BACKGROUND

The invention relates to a method for monitoring the functional state of an installation for computed-tomography examination of workpieces according to the preamble of claim 1, and to a corresponding apparatus according to claim 14 and a computer-readable medium according to claim 15.

Computed-tomography examinations are increasingly also used, besides the known medical applications, for quality assurance and materials testing in the production of workpieces. In this manner, it is in particular also possible for nondestructive examinations of the internal or difficult-to-reach regions of a workpiece and dimensional measurements to be performed on the workpiece. In this case, however, it is always necessary to ensure that the scans or images produced by the computed tomography scanners used also actually reproduce reality with sufficient accuracy. As such, for example wear phenomena or defects on the installation can lead to a gradual or short-time drop in the quality of the scans. Monitoring of the correct functional state of the computed tomography scanner is thus necessary to ensure the relevance of the collected data.

There have been various approaches to date for monitoring computed-tomography examinations on workpieces. A first approach provides for the use of measurement standards. This involves a calibrated test specimen being used to ascertain a reference value for a particular measure, which is then compared against ascertained measured values in continually repeated measurements on the test specimen. A disadvantage in this case, however, is that, for many geometries and structures that are to be examined, it is not possible or not economical to produce a metrologically appropriate calibrated measurement standard. Thus, the measured variables stipulated by a measurement standard often do not correspond to those measured variables that are relevant for assessing the production quality of an examined object. If this first monitoring approach is performed with a calibrated workpiece, the method is normally restricted to externally accessible geometries, since only these are capable of calibration externally by metrology. Capturing internal geometries by splitting up and calibrating the individual parts, and then using the body in the reassembled state for monitoring, leads to diverse problems in reality. For example, in this case it can cause deviations as a result of deformation of the workpiece by the splitting, deviations as a result of loss of material during the splitting and deviations as a result of the frequently required registration of the individual parts for an overall geometry.

Further, any monitoring of the installation using a measurements standard requires current measurement operation to be interrupted, which means that the efficiency of use of the installation is not optimum. In this case, it is usually necessary for the monitoring of the installation using a measurement standard to be repeated at regular time intervals in order to achieve adequate protection for the measured values ascertained with the installation. In particular if the permissible tolerances for measurement using the installation are very low, very close-meshed monitoring over time by means of measurements standards can become necessary. Particularly in the case of very accurate measurements with low error tolerances, frequent interruption to measurement operation can therefore arise, which greatly limits the efficiency of use of the installation.

A second approach involves operating parameters of the installation used being monitored. Operating parameters can be for example electrical operating parameters (voltage or current of the X-ray tube) or mechanical parameters, such as for example the attaining of setpoint positions and deviations therefrom. It is alternatively possible for automated tests on simple image parameters to be performed. A disadvantage in this case is, inter alia, that this monitoring is not very specific. A warning about a malfunction in the installation is thus possibly provided too early or too late.

Finally, implicit monitoring of scans frequently also takes place by virtue of the scan results being inspected and rated by a human user or expert. The "sharpness" of sectional images or the shape of surfaces is commonly subjected to visual observation in this case. However, this monitoring takes place only at points or locally, since it is very time consuming to rate complete CT scan in this manner. The quality of this monitoring is moreover highly dependent on the competence and prior knowledge of the expert and has natural variations—e.g. as a result of strain, fatigue or simply lack of time.

The present invention is by contrast based on the object of providing an improved method for monitoring the functional state of an installation for computed-tomography examination of workpieces that overcomes the aforementioned disadvantages of the prior art.

Main features of the invention are specified in the characterizing part of claim 1 and in claims 14 and 15. Refinements are the subject of claims 2 to 13.

In a first aspect, the invention relates to a computer-implemented method for monitoring the functional state of an installation for computed-tomography examination of workpieces. In this case, a computed-tomography examination of a workpiece comprises the performing of one or more computed-tomography measurements on the workpiece, wherein the measurements each result in at least one measured value for at least one measured variable. The method for monitoring the functional state in this case initially comprises selecting measured values for at least one measured variable from at least two measurements on one or more workpieces. At least one scatter measure for the selected measured values of the at least one measured variable and at least one reference scatter measure for measured values of the at least one measured variable are then ascertained. The functional state of the installation is then ascertained by comparing the at least one ascertained scatter measure with the at least one reference scatter measure for the at least one measured variable.

A "computed-tomography measurement" is intended to be understood in this case to mean the evaluation of computed-tomography measurement data for ascertaining measured values for a measured variable. In this case, the measurement data are obtained from at least one computed-tomography scan or image of a scanned workpiece. It is therefore entirely possible that a data record, obtained as a result of a computed-tomography scan, for an examined workpiece is evaluated repeatedly, so that one or more measured values are ascertained for one or more measured variables from a single data record. A plurality of measurements therefore does not necessarily also mean a plurality of scans by the computed-tomography installation.

A "measured variable" can be understood in this case to mean a particular dimensionally measurable, or measurable in the course of nondestructive testing, dimensional property of a workpiece. By way of example, a measured variable can be the orientation (position) of an edge in the workpiece, the diameter of a hole, the density and/or size and/or orientation of pores in a workpiece or the like. A measured variable does not necessarily have to be a dimensional property of a workpiece, however. Rather, a measured variable can also be a variable that is ascertained not from the image of the workpiece produced by a scan but rather from the image of the scan per se. By way of example, measured values for such a measured variable can also be ascertained from a projection image produced in the course of a scan or from the reconstructed volume data in the surroundings of the presumed object surface. Examples of such measured variables would be grayscale value distributions or noise values in defined regions of a projection image or of the reconstructed volume.

The use of measured variables derived from the projection images produced for a scan in this case has the advantage that the raw data of the scan can be used for assessing the state of the installation. By contrast, dimensional measured variables of the workpieces initially require a reconstruction of the examined workpiece by means of back-projection of the projection data. This usually involves filters being used in order to obtain as sharp an image as possible. However, this results in a loss of information that can be useful for assessing the functional state of the computed-tomography installation used.

The measured variables are rated on the basis of a computed-tomography examination for a workpiece, so that one or more numerical values are obtained as a measured value. Therefore, a measured value can be for example a length measure, a density or another value that characterizes not the workpiece per se but rather the scanned image. However, a measured variable does not necessarily have to be just a directly measurable variable, such as an edge length. Rather, a measured variable can also be a derived variable, such as for example an average surface quality in a particular region of an examined workpiece. A measured variable can also be a grayscale value in a particular region, or can be a signal-to-noise ratio of a scan. Generally, measured values ascertained in the course of the measurements can also be used in this case to derive measured variables that permit a comparison of measurements with one another.

According to the invention, at least one scatter measure for the measured values for the measured variable under consideration is ascertained from the measured values from at least two measurements on one or more workpieces. A scatter measure can be a measure that contains information about the distribution of the measured values. As such, the scatter measure can be for example a variance, a mean value, an interval or a standard deviation of the measured values. Further, a scatter measure can also be a correlation with one or more further measured values, or can describe a minimum or maximum value for a random sample. The scatter measure indicates a characteristic quantity allowing determination of the functional state of the installation.

The scatter measure thus ascertained is then compared with a reference scatter measure in the further course of the method in order to ascertain the functional state of the installation. In this case, the reference scatter measure can be retrieved from a database, for example. As with the scatter measure described previously, the reference scatter measure can also be a measure that is a statistic distribution of measured values. However, the reference scatter measure does not necessarily have to be the same kind of scatter measure as the scatter measured determined from the measured values. As such, the reference scatter measure can be for example a range of permissible values or a reference variance, while the scatter measure of the measured values can be the mean value of the selected measured values.

The use of statistical variables for determining the installation state in this case has the advantage that variations on account of production tolerances in the workpieces have no or only a very small influence on the result of the ascertainment of the functional state of the installation when assessing the functional capability of the computed-tomography scanner used. As such, for example when a mean value is used as scatter measure for the measured values, statistical variations in the individual workpieces are averaged out. Therefore, only a systematic deviation in the measured values can lead to the functional state of the installation being assessed as problematic.

The individual method steps do not necessarily have to be executed in the order described previously. Rather, a different order, if it makes logical sense, is also entirely possible.

The functional state of the installation can in this case be ascertained, according to one embodiment, by virtue of a difference between the at least one ascertained scatter measure and the at least one reference scatter measure being ascertained and the ascertained difference being compared with at least one permissible range of values for the difference. If the difference is outside the at least one permissible range of values in this case, information is output, the information indicating that the ascertained difference is outside at least one permissible range of values.

A "difference" between a scatter measure and a reference scatter measure can be understood in this case to mean not only for example a difference between the two values but also a percentage deviation or the like. By way of example, a difference can also be ascertained by checking how much a range defined by the scatter measure overlaps a range defined by the reference scatter measure, that is to say how large the intersection is. If the ascertained difference in this case is outside at least one permissible range of values, information is output. In this case, the information can either be output by the computed-tomography scanner itself, for example in the form of a visual or audible warning signal, or the information is forwarded in digital form as a signal to a peripheral device and processed there. By way of example, the information, when forwarded to a peripheral device, can lead to a log file being created in which the ascertained deviations or differences are noted. Such a log file could then be used for example to plan maintenance for the computed-tomography scanner.

In this case, it should be borne in mind that, according to the invention, it is also possible for multiple permissible ranges of values to be defined for the ascertained difference. By way of example, it would thus be possible for a kind of "state traffic light" to be provided for the functional state of the computed-tomography scanner. If the ascertained difference is within a first range of values, it is assumed that the computed-tomography scanner is working very well, which means that no kind of measures for maintenance thereof are necessary and the ascertained values can be trusted without reservation. If the ascertained differences are outside the first range of values, but still within the second range of values, it is assumed that although the computed-tomography scanner is no longer working in optimum fashion, currently no measures for maintenance thereof are necessary yet. In this case, however, it can be assumed that maintenance will become necessary in the foreseeable time, which means that an appropriate maintenance plan is set up. If the ascertained difference is outside the first and outside the second range of values, however, it can be assumed that the computed-tomography scanner no longer provides sufficiently accurate measurement results and that maintenance of the computed-tomography scanner is necessary. The information that is output, as soon as the ascertained difference is outside a range of values, in this case also includes an indication of the range of values or of the ranges of values that have been left. The output information can also be used to block workpieces for further production or use, since the computed-tomography installation was not ensuring valid measurement.

The output information can also be used, according to a further embodiment, to initiate a check on the monitored installation by means of a measurement standard. The check by means of a measurement standard can then test whether the ascertained difference in the scatter measures that has led to the information being output was actually triggered by a faulty computed-tomography installation. The reason is that it is also entirely possible that the production of the examined workpieces is subject to systematic errors, for example brought about by an excessively high production temperature or other erroneous system parameters. Such sources of error can also arise insidiously. This would likewise result in systematic deviations in the measured values for the measured variables under consideration, which can lead to a deviation between the scatter measure ultimately ascertained from the measured values and the reference scatter measure. This deviation could then mistakenly be interpreted as being based on a malfunction of the measuring device. This erroneous interpretation can be avoided as a result of a test by means of a measurement standard, however.

Besides the distinction as to whether a deviation in the scatter measure is brought about by erroneous production or an erroneous scan, the embodiment described furthermore has the advantage that the generally complex check by means of a measurement standard is performed only if a specific reason for this can be deduced from the continual evaluation of measurement results. The previously described regular monitoring of the installation by means of a measurement standard could thus be modified to produce monitoring on demand. Effectively, it is thus possible for the number of interruptions to measurement operation for calibration by means of a measurement standard to be reduced in comparison with regular calibration and ultimately optimized, so that effectively the efficiency of use of the installation is increased.

As an alternative or in addition to the output of information, as has been described previously, it is possible, according to a further embodiment, for the ascertaining of the functional state of the installation to further comprise ascertaining a time characteristic of the ascertained scatter measure for a measured variable. A comparison of the ascertained characteristic with the at least one reference scatter measure then estimates when a difference between the scatter measure and the reference scatter measure will be outside at least one permissible range of values for the difference. In this manner, it is possible for example for a prediction to be made regarding the time from which the scans by the computed-tomography scanner will no longer be exact enough, owing to ongoing wear phenomena, to provide representative statements about the quality of the examined workpieces.

As has already been explained previously, the reference scatter measure used for ascertaining the functional state of the installation can be retrieved from a database, for example. Alternatively, however, according to one embodiment, there may also be provision for the at least one reference scatter measure to be ascertained in a training phase. In this case, the training phase initially comprises selecting reference measured values for at least one measured variable from a reference measurement series having a plurality of measurements on a plurality of workpieces. Subsequently, the at least one reference scatter measure is ascertained from the selected reference measured values of the at least one measured variable of the reference measurement series.

The use of such a training phase for ascertaining one or more reference scatter measures in this case has the advantage that the reference values can be ascertained using workpieces that are of the same design as the workpieces that are supposed to be analyzed and rated in the further course of the method. As such, the method described can ascertain very relevant reference values and reference scatter measures that are easily reproducible and comparable by measurements on the workpieces. Further, the reference scatter measures can be ascertained by a training phase by using measured values that are ascertained anyway in the course of workpiece testing. It is therefore not absolutely necessary to record a separate measurement series. Rather, measured values from the current workpiece testing can be used, so that no downtimes arise as a result of monitoring of the functional state of the installation.

In this case, according to a further embodiment, there is provision for the training phase to be performed immediately after a repair and restarting of the installation for computed-tomography examination of workpieces. In this case, it is assumed that after the repair on the installation the scans by the installation are exact or have as little error as possible. Therefore, the reference scatter measures ascertained in the training phase can be considered to be as exact as possible.

The previously described training phase for ascertaining one or more reference scatter measures can in this case be repeated at regular or irregular intervals of time and/or after the examination of a particular number of workpieces. As such, there can be provision for example for the training phase to be repeated after in each case 50, 100 or 200 examined workpieces or after a certain period or at defined times of day. Further, combined profiles can also be defined that stipulate the performance of the training phase. As such, it is possible to stipulate for example that the training phase is performed after 200 scans or after 2 hours' operating time, depending on which case arises earlier. In this way, it is possible to take into consideration, among other things, changes in the computed-tomography scanner used that, although they can lead to a systematic change in the measured values, are not attributable to wear on the computed-tomography scanner. By way of example, it can be expected that operation of the computed-tomography scanner leads to heating of system components over time, which can in turn entail a systematic change in measured values. Equally, it may be that, at different times of day during everyday operation of the installation, there are different utilization levels, which are taken into consideration by means of fresh performance of the training phase when ascertaining the reference scatter measures. The result of a training phase can in this case be complete renewal or just a partial update of the reference scatter measures.

To take into consideration further external influences on scans performed, there is provision, according to a further embodiment, for at least one reference scatter measure to be dependent on an environmental parameter of the installation.

In this case, an "environmental parameter" can be understood to mean for example the ambient temperature, the time of day, the weather, the operating time of the installation or the like. In this case, for example repeated training phases can each determine one or more reference scatter measures, with simultaneous recording of the environmental parameters being able to ascertain a correlation between the reference scatter measures and the environmental parameters. This correlation can then continue to be used to take into consideration and accordingly rate systematic inaccuracies in the recording of measurement data that, however, are not based on wear on the installation. Accordingly, different sets of environmental parameters can have reference scatter measures stored for them in a database, which, depending on prevalent environmental parameters, are used for monitoring the functional state of the installation. Further, environmental parameters can also take into consideration other aspects such as production machine operators, metrology operations and tolerances in the production.

In a further embodiment, the measured values are ascertained from one or more projection images of the examined workpiece and/or from a three-dimensional reconstruction of the examined workpiece that is produced by means of the projection images of the examined workpiece.

To constantly ensure the correct operation of the computed-tomography scanning used, there is provision, according to a further embodiment, for the selecting of measured values, the ascertaining of a scatter measure for the selected measured values and the ascertaining of the functional state of the installation each to be repeated after the examination of at least one workpiece. By way of example, 5, 10, 50 or 100 workpieces can be followed in each case by determination of the functional state of the installation again in the spirit of the previously described invention. When choosing the density of determinations of the functional state, that is to say the number of workpiece tests after which determination of the functional state on the basis of scatter measures is performed again in each case, it is necessary to take into consideration firstly the desired test density and secondly the computation load caused by a test. These two factors need to be weighed up against one another depending on requirements and available resources. Further, there can be provision in this case for the density of the tests not to be constant over time, but rather to be varied on the basis of external parameters. By way of example, there can be provision for the test density to be chosen to be very high shortly after the installation is started and to initially decrease as operating time increases. Equally, there can also be provision for the test density to be increased again after a certain operating time, since there are more likely to be faults or wear on the installation after lengthy operation of the installation. Further, the test density can also be dependent on external parameters such as an ambient temperature, or can be specifically set in the short term by a manager using an appropriately configured electronic data processing (EDP) system. The latter can be done e.g. when prescribed tolerances for measured variables that are to be measured or tested change or when the tolerance utilization level of the workpieces changes.

According to a further embodiment, there is provision for the measured values for ascertaining the scatter measure to be selected from measurements on directly successive workpieces. In this way, a good snapshot of the state of the installation can be provided.

According to a further embodiment, the measured variables used for ascertaining the scatter measures comprise workpiece-specific measured variables, wherein the workpiece-specific measured variables can be ascertained only on a particular kind of workpiece. A workpiece-specific measured variable is accordingly for example a dimension of a particular geometry of the examined workpiece or an average local surface quality in a workpiece domain prescribed in a spatially accurate manner. The use of workpiece-specific measured variables for determining the scatter measures in this case has the advantage that variations that arise relate to precisely those measured values that for example can also be used for assessing the quality of the tested workpieces. Accordingly, in this embodiment, it is very unlikely that a change in the functional state of the installation that causes inaccurate or no longer representative measured values will not be detected on account of an unfavorable choice of measured values. Also, these workpiece-specific measured variables ensure that changes in the installation that are irrelevant to the measured variable do not lead to a statement about an installation fault. The monitoring therefore becomes more efficient and more economical.

Analogously, however, according to embodiments, there can also be provision for the measured variables used for ascertaining the scatter measures to comprise workpiece-aspecific measured variables, wherein the workpiece-aspecific measured variables can be ascertained on different kinds of workpieces. A workpiece-aspecific measured variable can be for example the poorest signal-to-noise ratio of the material grayscale values over the random sample in the relevant workpiece domains. Further, the dimensions of standardized workpiece sections, such as for example standardized screw holes, can also be used for ascertaining a workpiece-aspecific measured variable. The use of workpiece-aspecific measured variables in this case has the advantage that different workpieces can be checked using one and the same computed-tomography installation and it is nevertheless possible to rate the functional state of the installation from the measurements on the different workpieces. Therefore, the application scenarios of the monitoring performed are more flexible.

According to a further embodiment, there is provision for the measured values selected for the determination of the at least one scatter measure to come from at least one defined subregion of a workpiece, for which a scatter measure, ascertained from the measured values, for a measured variable can be compared with the reference scatter measure for the measured variable. In particular, a subregion of a workpiece that is of particular relevance for the quality test on the workpiece can be chosen in this case. By way of example, there can be provision for the pore density in a structurally important section of an examined workpiece to be used for the reference scatter measure. In this way, it is likewise possible to ensure that a change in or worsening of the functional state of the installation is safely detected, in particular given relevant measured variables. In a further aspect, the invention relates to an apparatus for monitoring a functional state of an installation for computed-tomography examination of workpieces, wherein the computed-tomography examination of a workpiece comprises the performing of one or more computed-tomography measurements on the workpiece, wherein the measurements each result in at least one measured value for at least one measured variable. In this case, the apparatus for monitoring the functional state is designed to:

select measured values for at least one measured variable from at least two measurements on one or more workpieces, ascertain at least one scatter measure for the selected measured values of the at least one measured variable, ascertain at least one reference scatter measure for measured values of the at least one measured variable, and ascertain the functional state of the installation by comparing the at least one ascertained scatter measure with the at least one reference scatter measure for the at least one measured variable.

In yet another aspect, the invention relates to a computer-readable medium having computer-executable instructions that, when executed on the computer, prompt the computer to perform the method as described previously.

DESCRIPTION OF THE FIGURES

Further features, details and advantages of the invention are obtained from the wording of claims and from the description of exemplary embodiments that follows on the basis of the drawings, in which:

DETAILED DESCRIPTION

Figure 1:
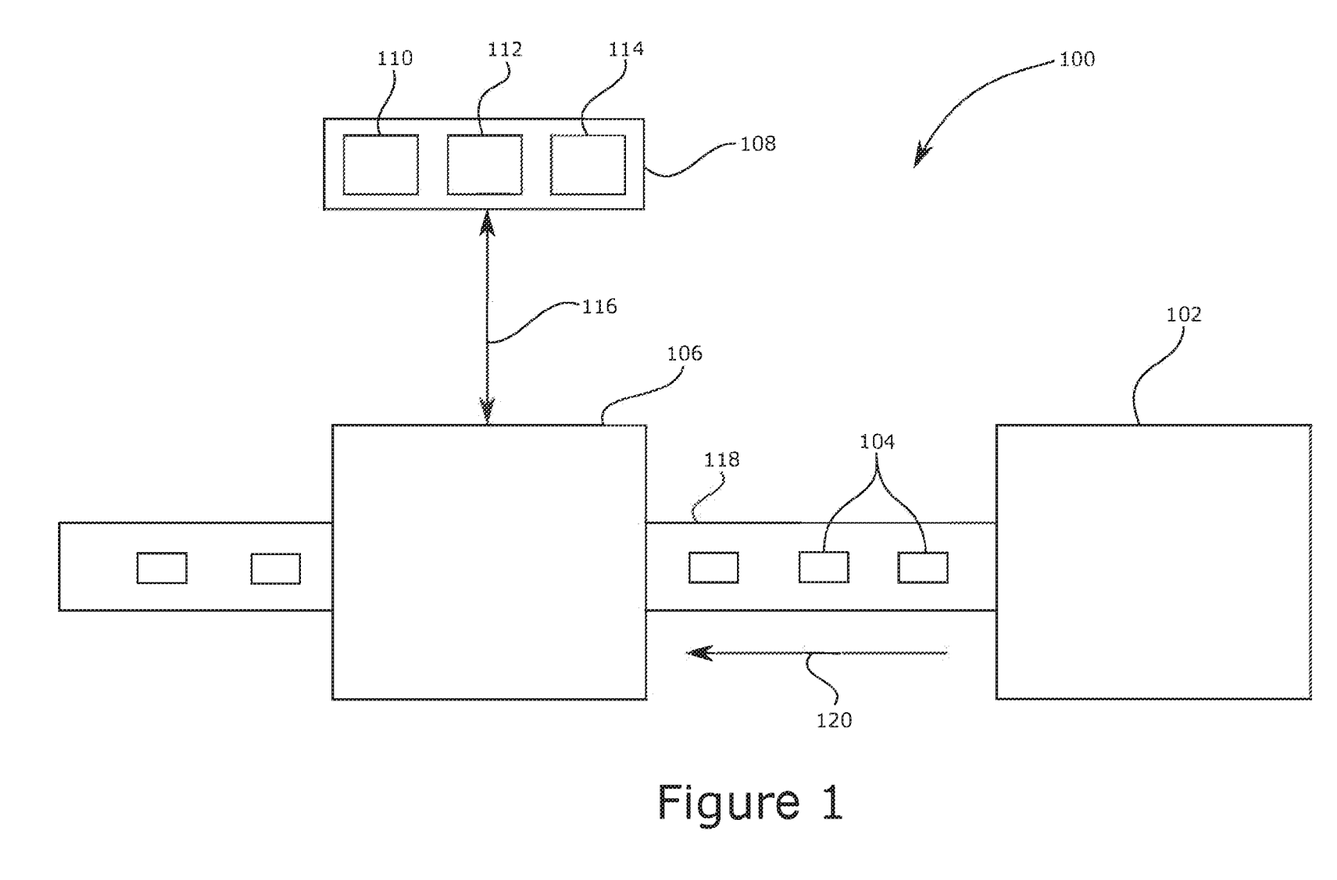
FIG. 1 shows a schematic depiction of an exemplary production environment for application of the method according to the invention.

FIG. 1 shows a schematic depiction of an environment 100 in which the method according to the invention can be applied. The environment 100 is a production environment in which, in exemplary fashion, a manufacturing installation 102 is arranged that is designed to produce workpieces 104. The manufacturing installation 102 can be for example an injection molding installation for manufacturing injection molded parts. The workpieces 104 thus produced are subsequently supplied to an installation 106 for computed-tomography examination of the workpieces 104. This can be effected for example by a conveyor belt 118, depicted in exemplary fashion, with the running direction 120. The depicted design could perform an in-line test on workpieces 104 produced by the manufacturing installation 102.

The computed-tomography examination performed using the installation 106 is supposed to involve the workpieces 104 being checked for their production quality. On the basis of this check, it is possible for example to decide whether a workpiece 104 complies with a set of minimum requirements for quality and hence can be sold/distributed, or whether the workpiece 104 must be regarded as a reject on account of inadequate production quality. To this end, the installation 106 is for example designed to produce radiographic projection images of the checked workpieces 104, which can be analyzed by means of an EDP installation 108 associated with the installation 106. To this end, the EDP installation 108 is equipped at least with processor means 110, memory means 112 and display means 114 and connected to the installation 106 via a communication connection 116. The analysis by the EDP installation 108 can relate in this case both to the radiographic projection images recorded and to depictions of the examined workpiece 104 that are reconstructed from radiographic projection images. In this case, both three-dimensional and two-dimensional reconstructions of the workpiece 104 can be used for analysis. The communication connection 116 can be used to transmit measurement data to the EDP installation 108, said measurement data being able to be stored in the memory means 112 therein and/or processed by the processor means 110.

The processor means 110 can be for example one or more single-core or multicore processors. Equally, the memory means 112 can be any form of data memory. The display means 114 can be provided, in exemplary fashion, by one or more monitors and/or by signal lamps. The EDP installation 108 is depicted as a coherent unit purely in exemplary fashion in this case. The EDP installation 108 can naturally also be a system of computer systems. The individual computer systems in this case do not necessarily have to be physically grouped. Instead, a distributed computer system can also be used as an EDP installation 108, for example in the spirit of cloud computing.

From the analysis of the radiographic projection images of a workpiece and/or from the analysis of a complete two or three dimensional reconstruction of the workpiece 104 from the projection images, the EDP system 108 is designed to use appropriate software to ascertain measured values for different measured variables of the workpieces. By way of example, a measured variable can be an edge position, an average surface quality, a material density, a pore density or similar variables. However, a measured variable can also be workpiece-aspecific and indicate a measure of the image quality of the recorded projection images. The measured values ascertained for these measured variables are then tested against permissible ranges of values or limit values, and the concordance with the ranges of values and/or limit values is used to determine whether a workpiece 104 complies with the quality requirements.

During the operation of a computed-tomography installation 106, operation can result in a multiplicity of effects occurring that influence the previously described examination and rating of workpieces 104. By way of example, as the operating period of the installation 106 progresses, for example wear phenomena appear on the X-ray tube used, this being reflected in increasing noise values for the projection images produced or the reconstruction depictions of the workpiece 104. Further, mechanical effects such as jolts and vibrations can result in the setting of the focusing optical system of the computer-tomography scanner changing, as a result of which the measured values produced are likewise distorted. These effects can sometimes lead to the analysis of a workpiece 104 resulting in measured values being ascertained that lead to the quality of the workpiece 104 being rated as adequate or inadequate even though this is not actually the case. While mistaken rating of the quality of a workpiece 104 as inadequate merely results in the number of rejects being unnecessarily increased, the opposite case, that is to say mistaken rating of the quality of the workpiece 104 as adequate, can quickly result in a liability situation for the installation operator should there be an accident or another serious malfunction in the workpiece. It is therefore always necessary to ensure that the measured values determined by means of the installation 106 are representative.

To this end, the EDP system 108 is designed by means of the method according to the invention to use the ascertained measured values of the workpieces 104 to also derive, in addition to an assessment of the quality thereof, a rating or monitoring of the functional state of the installation 106.

Figure 2:
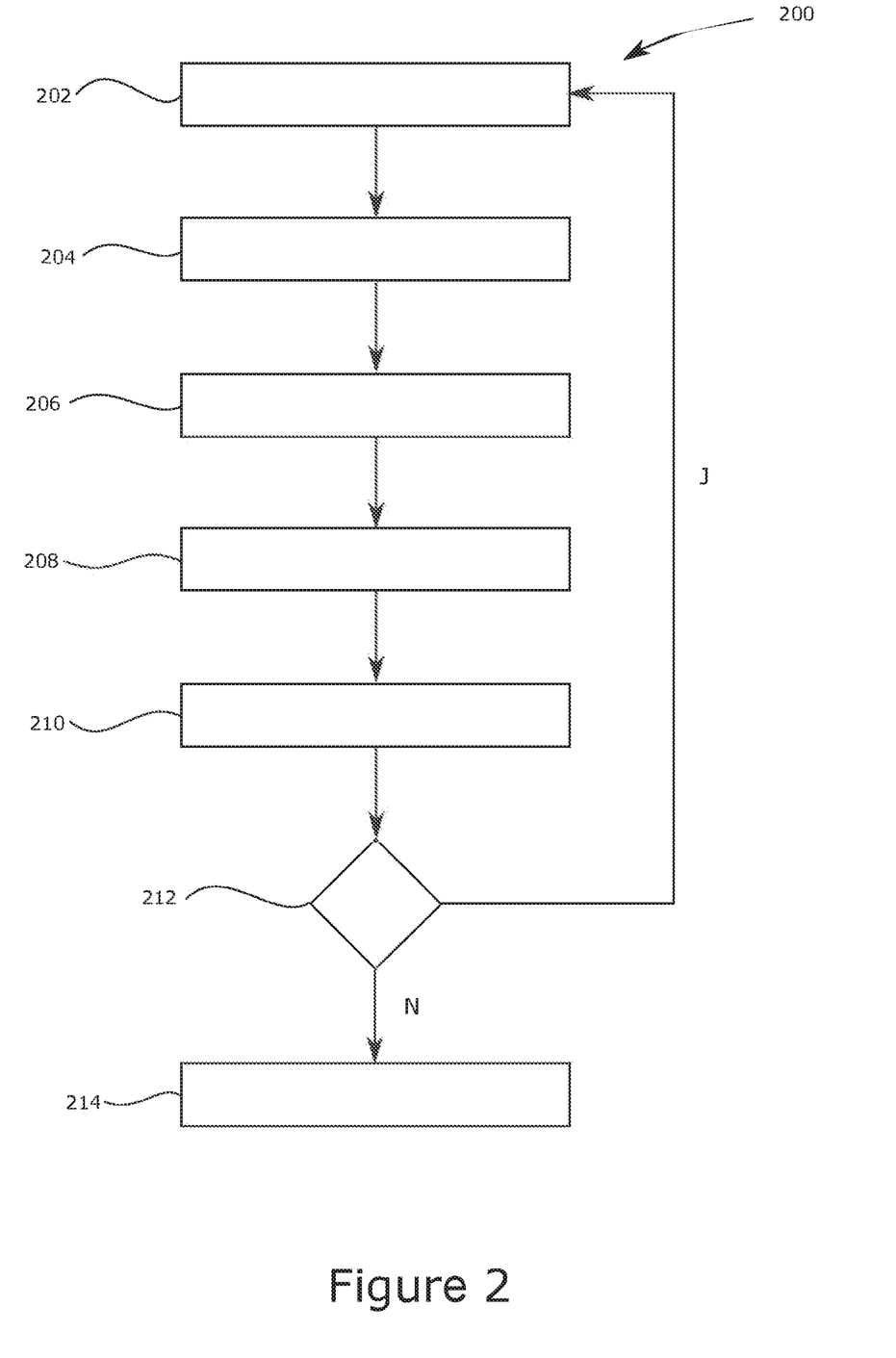
FIG. 2 shows a flowchart for the method according to the invention.

The method according to the invention is depicted in FIG. 2 in the form of a flowchart 200. In this case, a first method step 202 initially involves a computed-tomography image of at least one workpiece 104 being used to ascertain measurement data for the workpiece(s) 104. In the course of the evaluation of the measurement data thus obtained, measured values for one or more measured variables for the at least one workpiece 104 are then determined. These can be the same measured variables as are also used for rating the quality of the workpieces 104. However, it is also possible to define special derived variables that are used only for monitoring the functional state of the installation 106.

From the multiplicity of measured values ascertained in the course of the examination of workpieces 104, a set of measured values that are supposed to be used for ascertaining the functional state of the installation 106 is then selected in step 204. This can involve for example measured values from measurements on directly successive workpieces 104 being used, in order to achieve as high a monitoring density as possible. However, it is also possible for only measurements on a single workpiece 104 to be used. Furthermore, measured values that are afflicted by as low a measurement uncertainty as possible are preferably used for assessing the functional state.

The measured values thus selected are then used to ascertain a scatter measure for the measured values in step 206. The scatter measure can be a statistical measure, such as for example variance, the mean value, a range of values, a highest or lowest value or the like.

To obtain as good as possible an ascertainment of the statistics of the measured values, it is useful to select a sufficiently large random sample in step 204. In this case, however, it should also be taken into consideration that an excessively large random sample entails a high level of data processing complexity, which means that a tradeoff should take place in this case according to the requirements and available resources.

Besides the scatter measure of the measured values from the measurements on the workpieces, a reference scatter measure is further ascertained in step 208. In this case, the reference scatter measure should preferably provide information about the statistics of precisely that measured variable that are used for ascertaining the scatter measure or the scatter measures in step 206. However, the kind of reference scatter measure does not necessarily have to be the same kind of statistical information as was chosen for determining the scatter measure of the measured values. As such, for example the reference scatter measure can indicate a range of values for a particular measured variable, while the scatter measure ascertained from the measured values indicates a mean value from measured values. In this case, there can be provision for the memory means 112 of the EDP installation 108 to store reference scatter measures, so that ascertainment of the reference scatter measures requires only the memory means 112 to be accessed, and the required reference scatter measures are retrieved.

However, it is also possible for reference scatter measures to be ascertained in a separate training phase. In this case, measured values are again selected from measurements on workpieces 104, and the selected measured values are used to determine statistical measures that are then used as a reference scatter measure. In this case, such a training phase is preferably performed shortly or directly after a repair of the installation 106, since at this time it can be assumed that the installation is in the best possible state and hence provides representative results. The use of such a training phase can moreover have the advantage that the reference scatter measures can be ascertained using measured values from measurements on the same workpieces 104 whose quality is subsequently supposed to be assessed on the basis of the scans by the installation 106. Therefore, it is in particular also possible for workpiece-specific measured variables to be used in order to rate the functional state of the installation 106.

Further, it is possible for reference scatter measures to be ascertained repeatedly in the course of operation. As a result, it is possible for example to take into consideration a systematic drift in the recorded measured values that is not attributable, however, to a wear or a fault on the installation 106. Accordingly, different reference scatter measures can also exist for one and the same measured variable, these being applied on the basis of further parameters, such as for example ambient temperature, time of day or operating time of the installation 106. Further, a reference scatter measure can also consist of multiple values. By way of example, the reference scatter measure can comprise a mean value and a standard deviation for a particular measured variable.

After a reference scatter measure has been ascertained, a comparison of the scatter measures, that is to say the scatter measure ascertained from the measured values and the reference scatter measure(s), subsequently takes place in step 210. In this comparison, the functional state of the installation 106 is then deduced. By way of example, this can involve a difference between the scatter measure and the reference scatter measure being ascertained. The meaning of the term "difference" is in this case dependent on the kind of scatter measures used. If the scatter measures are mean values of an examined hole diameter, for example, the difference can be ascertained mathematically in the form of a difference formation for the two values. If the difference thus ascertained is larger than a particular limit value, it can be assumed that the functional state of the installation 106 can no longer provide representative measured values for the examined measured variables. Further, to stay with the example of the mean values, the difference can also be a percentage deviation.

The previously described comparison of the difference with a limit value does not necessarily require there to be provision for only one limit value. Rather, there can also be provision for a plurality of limit values or ranges of values to be defined that allow a gradual rating of the functional state of the installation 106. In this way, a state traffic lights for the installation 106 can be provided, which for example indicates whether the installation 106 operates with very good, still sufficient or no longer sufficient accuracy. In this case, the intermediate rating step described may be useful for use planning for the installation 106.

From the comparison of the scatter measure(s) with appropriate reference scatter measures, a decision is made in step 212 as to whether the state of the installation 212 is sufficient to provide representative results, or whether maintenance is necessary. If it is then found that the state of the installation 106 is in order, the testing of workpieces 104 is continued without alteration. If, on the other hand, it is found that the state of the installation 106 is no longer adequate, a warning can be output in step 214. In the simplest case, the warning can be a visual or audible signal.

At this juncture, there can also be provision for the ascertainment of the state of the installation 106 to be followed by information that describes the state of the installation 106 being produced and for example stored in the memory means 112 of the EDP system 108. In this case, for example a time characteristic of the state of the installation 106 can be ascertained, from which it is in turn possible for a time at which the installation 106 will no longer operate with sufficient accuracy to be extrapolated. This allows an optimized use and/or maintenance plan to be created for the installation 106.

The invention is not restricted to one of the embodiments described above, but rather is modifiable in a wide variety of ways.

All of the features and advantages, including design details, physical arrangements and method steps, that emerge from the claims, the description and the drawing can be essential to the invention either on their own or in a wide variety of combinations.

It is claimed:

1. A computer-implemented method for monitoring the functional state of an installation for computed-tomography examination of workpieces, wherein the computed-tomography examination of a workpiece comprises the performing of one or more computed-tomography measurements on the workpiece, wherein the measurements each result in at least one measured value for at least one measured variable, wherein the method for monitoring the functional state comprises the following steps:
   a. selecting measured values for at least one measured variable from at least two measurements on one or more workpieces,
   b. ascertaining at least one scatter measure for the selected measured values of the at least one measured variable,
   c. ascertaining at least one reference scatter measure for measured values of the at least one measured variable, and
   d. ascertaining the functional state of the installation by comparing the at least one ascertained scatter measure with the at least one reference scatter measure for the at least one measured variable.

2. The method as claimed in claim 1, characterized in that the ascertaining of the functional state of the installation has the following steps:
   a. ascertaining a difference between the at least one ascertained scatter measure and the at least one reference scatter measure,
   b. comparing the ascertained difference with at least one permissible range of values for the difference,
   c. if the difference is outside the at least one permissible range of values, outputting information,
   wherein the information indicates that the difference is outside at least one permissible range of values.

3. The method as claimed in claim 1, characterized in that the ascertaining of the functional state of the installation comprises the ascertaining of a time characteristic of the ascertained scatter measure for a measured variable, wherein comparison of the ascertained characteristic with the at least one reference scatter measure estimates when a difference between the scatter measure and the reference scatter measure will be outside at least one permissible range of values for the difference.

4. The method as claimed in claim 1, characterized in that the at least one reference scatter measure is ascertained in a training phase, wherein the training phase has the following steps:
   a. selecting reference measured values for at least one measured variable from a reference measurement series having a plurality of measurements on a plurality of workpieces,
   b. ascertaining the at least one reference scatter measure from the selected reference measured values of the at least one measured variable of the reference measurement series.

5. The method as claimed in claim 4, characterized in that the training phase is performed immediately after a repair and restarting and/or an initial measurement and restarting of the installation for computed-tomography examination of workpieces.

6. The method as claimed in claim 4, characterized in that the training phase is repeated at regular or irregular intervals of time and/or after the examination of a particular number of workpieces.

7. The method as claimed in claim 1, characterized in that at least one reference scatter measure is dependent on an environmental parameter of the installation.

8. The method as claimed in claim 1, characterized in that the measured values are ascertained from one or more projection images of the examined workpiece and/or from a three-dimensional reconstruction of the examined workpiece that is produced by means of the projection images of the examined workpiece.

9. The method as claimed in claim 1, characterized in that the selecting of measured values, the ascertaining of at least one scatter measure for the selected measured values and the ascertaining of the functional state of the installation are each repeated after the examination of at least one workpiece.

10. The method as claimed in claim 1, characterized in that the measured values for the ascertainment of the scatter measure are selected from measurements on directly successive workpieces.

11. The method as claimed in claim 1, characterized in that the measured variables comprise workpiece-specific measured variables, wherein the workpiece-specific measured variables can be ascertained only on a particular kind of workpiece.

12. The method as claimed in claim 1, characterized in that the measured variables comprise workpiece-nonspecific measured variables, wherein the workpiece-nonspecific measured variables can be ascertained on different kinds of workpieces.

13. The method as claimed in claim 1, characterized in that the measured values selected for the determination of the scatter measure come from at least one defined subregion of a workpiece, for which a scatter measure, ascertained from the measured values, for a measured variable can be compared with the reference scatter measure for the measured variable.

14. An apparatus for monitoring a functional state of an installation for computed-tomography examination of workpieces, wherein the computed-tomography examination of the workpiece comprises one or more computed-tomography measurements of the workpiece, wherein the measurements each result in at least one measured value for at least one measured variable, wherein the apparatus for monitoring the functional state includes an appropriately configured electronic data processing (EDP) system designed to:
   a. select measured values for at least one measured variable from at least two measurements on one or more workpieces,
   b. ascertain at least one scatter measure for the selected measured values of the at least one measured variable,
   c. ascertain at least one reference scatter measure for measured values of the at least one measured variable, and
   d. ascertain the functional state of the installation by comparing the at least one ascertained scatter measure with the at least one reference scatter measure for the at least one measured variable.

15. A non-transitory computer-readable medium having computer-executable instructions that, when executed on the computer, prompt the computer to perform actions comprising:
   a. selecting measured values for at least one measured variable from at least two measurements on one or more workpieces,
   b. ascertaining at least one scatter measure for the selected measured values of the at least one measured variable, c. ascertaining at least one reference scatter measure for measured values of the at least one measured variable, and
d. ascertaining the functional state of the installation by comparing the at least one ascertained scatter measure with the at least one reference scatter measure for the at least one measured variable.

\* \* \* \* \*